March 12, 1935.  J. O. HEINZE  1,993,963

SUPERCHARGER

Filed July 8, 1932  2 Sheets-Sheet 1

INVENTOR
John O. Heinze,

ATTORNEYS

March 12, 1935.  J. O. HEINZE  1,993,963
SUPERCHARGER
Filed July 8, 1932  2 Sheets-Sheet 2

INVENTOR
John O. Heinze,
BY
ATTORNEYS

Patented Mar. 12, 1935

1,993,963

UNITED STATES PATENT OFFICE 1,993,963

SUPERCHARGER

John O. Heinze, Detroit, Mich., assignor to Heinze Development Company, a corporation of Michigan Application July 8, 1932, Serial No. 621,508

4 Claims. (Cl. 230—116)

This invention relates to supercharging devices particularly adapted for use with internal-combustion engines.

The principal object of the invention is a supercharger device including an air pump, driven by a turbine which is operated by the exhaust gases of the engine, and serving to induce a pressure flow of air into the air intake side of the engine, that is to say to the carbureter, in the case of engines having carbureters.

A still further object is a novel form of supercharger adapted to be driven by a turbine which is operated by the exhaust gases of an internal-combustion engine.

A still further object is a novel form of turbine device, operated by the exhaust gases of an internal-combustion engine, and preferably provided with means for inducing a flow of cooling air into the turbine outlet chamber, the cooling air serving to cool the turbine parts.

A still further object is a novel form of supercharger having means whereby the air flowing through the supercharger will be cleaned of dirt, moisture and dust particles carried thereby.

A still further object is a supercharger device including a shell-like rotor, one end of which forms part of a turbine operated by exhaust gases from the internal-combustion engine and the other end of which forms part of an air pump for the air intake side of the engine.

Still further objects will readily appear upon reference to the following detailed description of a preferred embodiment and upon reference to the appended drawings, showing the same.

Figures 1, 4, 5:
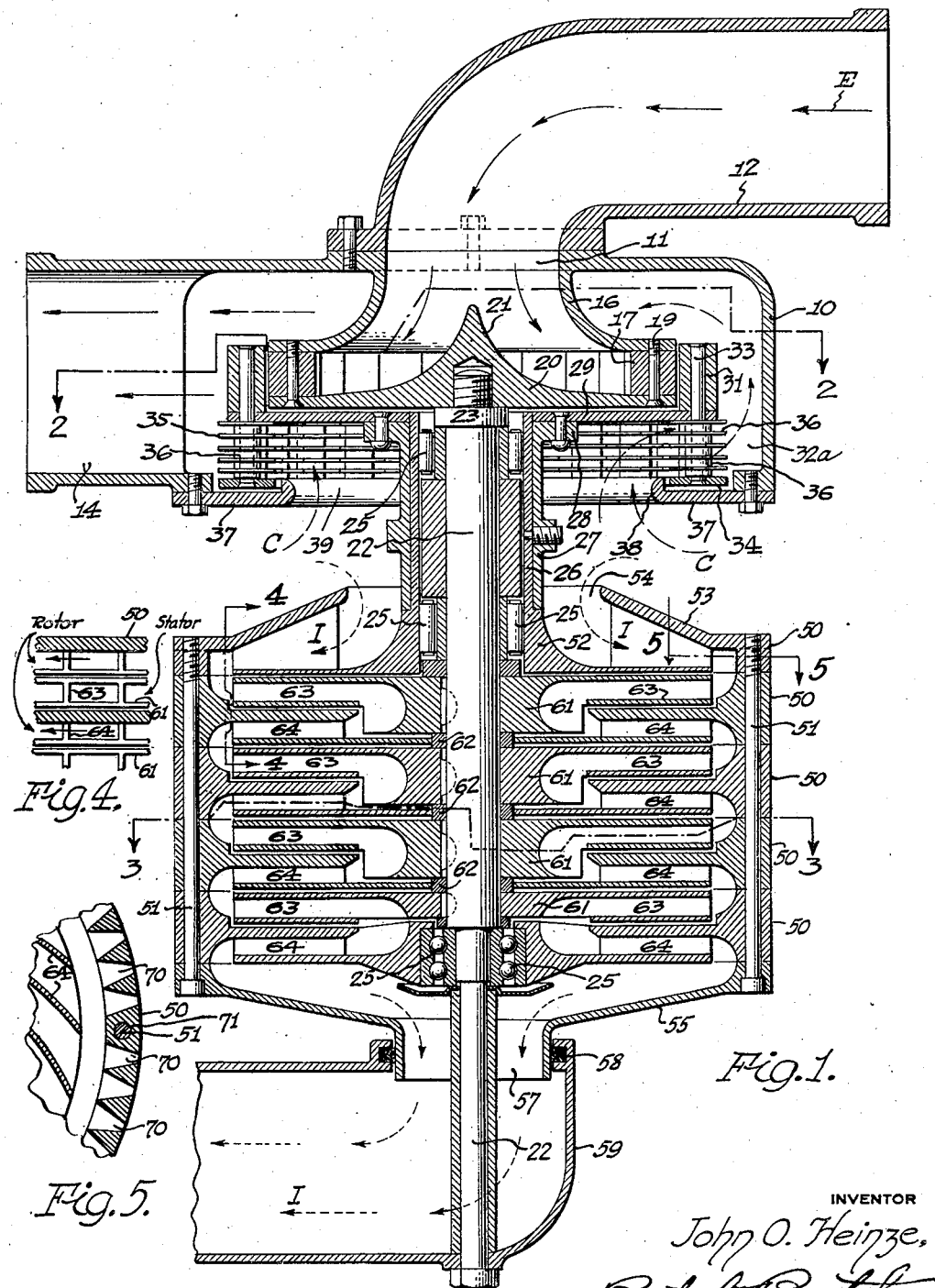
Figure 1 shows the device in elevational section.
Fig. 4 is a section as if on line 4—4 of Figure 1.
Fig. 5 is a partial section as if on line 5—5 of Figure 1.

Referring to the drawings, it will be seen that the supercharger device may roughly be divided into two parts, the upper one of which, in the form shown, is in the nature of a turbine operated by exhaust gases of the internal-combustion engine to which the device is applied, and the lower one is in the nature of an air pump outletting to the air intake of the engine. The inlet and outlet pipes for the device are stationary and support the device in operative connection with engine exhaust and air inlet.

Figure 2:
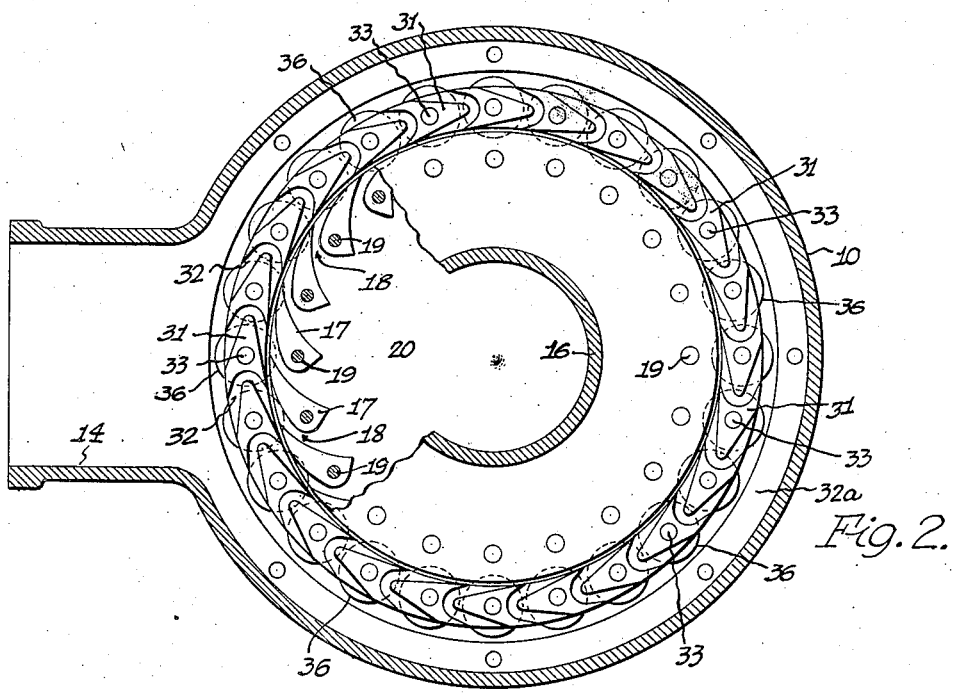
Fig. 2 is a section through the turbine part of the device as if on the line 2—2 of Figure 1.
Figure 3:
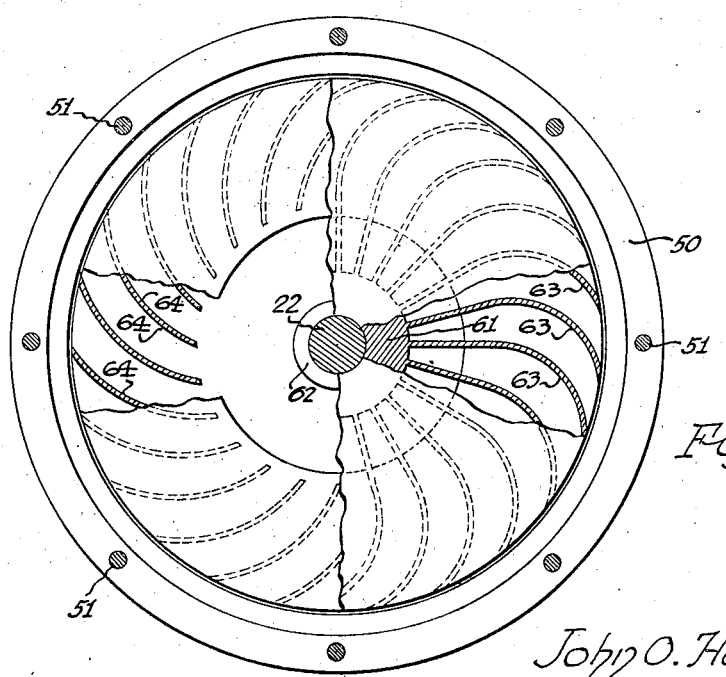
Fig. 3 is a section through the air pump part of the device as if on the line 3—3 of Figure 1.

The turbine part of the device includes a cylindrical body or casing 10 having an opening 11 in its upper end, into which leads the exhaust gas inlet pipe 12, the body also having a tubular lateral extension 14 forming an exhaust-gas outlet. It will be observed that the inlet is substantially axial of said casing and the outlet is substantially radial thereof. Integral with the body 10 and projecting downwardly from the top thereof, is a Venturi extension 16 of the inlet pipe 12 to the periphery of which venturi is secured an annular series of blocks or elements 17, the spaces between which elements, as indicated in Figure 2 at 18, constituting a stator set of nozzles. The elements 17 are secured to the venturi 16 by bolts 19 which pass therethrough, and these bolts also secure to the body 10, a conical plate 20 having an upwardly directed center cone 21 coaxial with the opening 11 and directed upwardly within the sleeve 16 to form an annular passage leading to the stator nozzles 18. Threaded into the central portion of the plate 20 at its lower side is the end of a main shaft 22 which is stationary and forms a support and journal for the various rotating parts of the device. The shaft 22 is provided with a flange 23 which forms an abutment to engage the plate 20 and also serves to locate the various sleeves and bushings upon said shaft.

Journaled upon said shaft 22 by means of anti-friction bearings 25, is a rotor, one of whose ends forms part of the turbine and the other of whose ends forms part of the air pump. The rotor includes an inner sleeve 26 to which is secured an outer sleeve 27, the latter having a flange 28 to which is riveted or otherwise secured, a rotor plate 29 underlying and spaced slightly from the plate 20. Secured to the peripheral portion of the rotor plate is an annular row of blocks 31 surrounding and spaced from said stator nozzles 18, to form a rotor ring encompassing and closely surrounding the stator ring of elements 17, the spaces between the elements 31, forming rotor nozzles 32 opening into the surrounding outlet chamber 32a of the body or casing 10, this chamber discharging through the exhaust gas outlet pipe 14. These blocks 31 are secured to the plate 29 by studs 33 projecting downwardly through openings in the plate 29, and upon the lower ends of which studs, is secured a ring 34. Strung upon these studs between the ring 34 and the plate 29, is a plurality of thin copper annular cooling fin plates 35 spaced apart on the studs by interposed washers 36 sleeved upon each stud. Secured to and partially closing the open lower end of the casing 10, is an annular plate 37 having an inwardly turned lip 38 extending adjacent the inner edge of the ring 34 and forming the periphery of a large central air inlet opening 39 into the lower end of said casing.

The operation of the turbine will now be described. Exhaust gases from the exhaust manifold of the internal combustion engine to which the pipe 12 is secured and which gases are represented by the full line arrows E, enter the turbine casing 10 through opening 11, and passing through the Venturi passage 16, is directed, thereby radially outward through the stator nozzles 18 into the rotor nozzles 32 with a reactionary effect thereon, and thence into the outlet chamber 32a, from which chamber these gases escape to the exhaust gas outlet pipe 14, these gases, passing through said nozzles 18 and 32, causing rotation of the rotor in the usual and well known manner. Such rotation of the rotor causes a flow of cool air, represented by the dash-line arrows C, from outside the casing through the large central air inlet opening 39 in its lower end and passes outwardly between the cooling fins 35, into the outlet chamber 32a, from which chamber this cool air escapes along with exhaust gases through the outlet 14. This cooling air as it passes outwardly between the spaced apart fins 35, causes the latter to be cooled and thereby cools the working parts of the turbine.

The air pump part of the device includes a casing built up of a plurality of annular members 50 held together at their peripheries by bolts 51 as indicated. These members 50 together form the rotatable part of the blower, the upper end member of which is formed with a disk 52 integral with the sleeve 26 and which disk forms, between it and a frusto-conical end wall 53 of the member having a central air inlet opening 54, an annular inlet passage for said pump casing, and across which passage extends a plurality of curved vanes 64 integral with said wall and disk. The lower end member 55 of the pump rotor is also of frusto-conical form and terminates in a central annular flange or tubular extension 57 forming the pump outlet, a packing 58 being interposed between said flange and the end of the air pump outlet pipe 59 into which said flange projects, said pipe being in communication with the air intake side of the internal combustion engine, and which pipe affords a bearing for the lower end of the shaft 22 which extends axially through said extension. The intermediate members 50 between said end members, are each formed with an inwardly extending flat annular wall corresponding in width to the wall 53 and a disk-like part corresponding to the disk 52, each member being also formed with a series of vanes 64 connecting said disk and wall. The stator part of the air pump includes a plurality of disk-like members 61 fixed in any suitable manner to the shaft 22 and stationarily held thereby, said members being spaced from each other by the spacing rings 62 and into which spaces the disk portions of the members 50 project. These stator members 61 are also each provided with outwardly projecting laterally curved vanes 63 formed integral with said disk portion thereof and with a spaced annular wall corresponding to the wall 53 of the members 50. The peripheral portions of these stator members carrying the vanes 63, are interposed between the inwardly projecting portions of the rotor members 50 carrying the vanes 64.

The operation of the air pump is as follows: Air, represented by dotted line arrows I, is drawn into the air pump through the central opening 54 and is directed radially outward at first by the central cone 52 through the passage formed between said conical disk and the frusto-conical wall 53. The direction of flow of air is then changed by the walls of the members 50, the air then flowing longitudinally of the rotor for a short distance and then radially inward into the spaces between the vanes 63 of the uppermost stator ring 61, the air then passing between the stator vanes and being retroverted thereby between the vanes of the next adjacent rotor. The air continues along this path, radially outward between the vanes 64 of one rotor 50 and then radially inward between the vanes of the next stator 61 until it reaches the chamber formed by the end member 55 of the rotor, where it is directed downwardly through the outlet 57, and into the outlet pipe 59, the pressure of air in the pump being built up as the flow continues.

As shown in Fig. 5, the peripheral wall of the upper one of the rotor members 50, is formed with a series of closely spaced, tapered openings 70 opening radially outward through said wall throughout the length thereof between the several holes 71 through which the bolts 51 pass, these holes being opposite the outer ends of the vanes extending across the air inlet passage and where the direction of flow of air in the first stage of the pump is changed from an outwardly to a downwardly direction. These holes therefore permit the relatively heavy dirt, moisture and dust particles carried by the incoming air to escape, being separated by centrifugal action from the relatively light air stream by being ejected through these holes, and the air is thus cleaned on its way to the internal combustion engine air intake.

It will be observed that the device disclosed is simple in construction, efficient in operation, and its arrangement is such as to particularly adapt it for application to internal combustion engines as commonly constructed. Further it will be observed that the exhaust gas turbine is cooled by the presence of the cooling vanes and the flow of cooling air, and that the exhaust gases are completely isolated from the air that flows through the air pump.

Now having described the invention, and a preferred embodiment of the same, reference will be had to the following claims which define the scope of the invention, it being clearly understood that the same is not to be limited to the specific details of construction heretofore disclosed and described.

What I claim is:—

1. A supercharger for internal combustion engines, comprising a driving unit including a casing having an end inlet and a side outlet, a stator, and a rotor in said casing, and means for conducting exhaust gases to said inlet to drive said rotor; a fixed shaft upon the end of which said stator is mounted; and an air pump unit including a plurality of stator members fixed upon said shaft, a plurality of rotor members together forming a casing enclosing said stator members, said casing having an air inlet at one end with said end spaced from said driving unit and an outlet at its opposite end adapted to be connected to the inlet of an internal combustion engine, and means rotatively mounted upon said shaft and extending through said inlet of said casing and secured to said rotor members at its inner end and to said rotor of said driving unit at its outer end.

2. A supercharger for internal combustion engines comprising a driving unit and an air pumping unit, said driving unit including a fixed casing having an axial exhaust gas inlet opening in its upper end, a stator within said casing forming passages leading from said axial opening, and a rotor surrounding said stator, said casing having an axial air inlet opening in its lower end and a lateral exhaust opening; a fixed shaft to the upper end of which said stator is secured with said shaft extending downwardly through said air inlet opening of said casing; said air pumping unit including a plurality of stator members secured to said shaft at a distance below said casing of said driving unit, and a plurality of rotor members together forming a casing enclosing said stator members and rotatably mounted upon said shaft, said rotor members having portions projecting inwardly between portions of said stator members and forming air passages therebetween, said casing formed by said rotor members having an upper end formed with an air inlet opening surrounding said shaft and a lower end formed with a flanged outlet opening; and an air pipe having an opening to receive the flange of said air outlet, said pipe being formed with a bearing axially of said outlet for the lower end of said shaft.

3. A supercharger for internal combustion engines comprising a driving unit including a casing having an axial exhaust gas inlet opening in its upper end, an axial air inlet opening in its lower end and a lateral exhaust gas outlet, a Venturi member forming a passage in said casing leading from said inlet opening, a conical plate, a plurality of stator nozzle forming members secured between the peripheral portions of said Venturi member and conical plate, a rotor plate beneath said conical plate, and a plurality of rotor nozzle forming members secured to the peripheral portion of said rotor plate and projecting upward opposite said stator nozzle members; a fixed shaft secured at its upper end to said conical stator plate and extending downward through said axial air inlet opening in the bottom of said casing; a sleeve rotatively mounted on said shaft and to which said rotor plate is secured; and a pumping unit mounted upon said shaft and including a plurality of stator members fixed to said shaft, and a plurality of rotor members connected to said sleeve to turn therewith and together forming a casing inclosing said stator members.

4. A device for the purpose described including a driving unit and an air pumping unit below said driving unit; said pumping unit comprising a vertical shaft extending downwardly from said driving unit, a sleeve upon said shaft driven by said driving unit, a plurality of stator members secured to said shaft and each being of disk-like form with vanes upon a peripheral portion of each disk, a plurality of rotor members the peripheral portions of which together form a cylindrical casing wall with each member formed with an inwardly extending annular disk-like wall formed with a plurality of vanes and overlapping the outer portions of the stator members which are provided with vanes, the upper end member of said series of rotor members being connected to the lower end of said sleeve and formed with a truncated conical wall forming an end wall of said casing and having an axial air inlet opening surrounding said sleeve, and the lower end member of said series of rotor members being formed with a wall forming the lower end wall of the casing, said wall having an axial flanged outlet opening, and an air outlet pipe over said flanged opening and having a bearing for the lower end of said shaft.

JOHN O. HEINZE.